United States Patent
Solt et al.

(10) Patent No.: US 10,753,461 B2
(45) Date of Patent: Aug. 25, 2020

(54) SYSTEMS AND METHODS FOR PROGRAMMING A GEAR SHIFT SEQUENCE FOR A CUSTOM SHIFT MODE OF AN AUTOMATIC TRANSMISSION

(71) Applicants: Michael B Solt, Oxford, MI (US); Caleb M Coats, Royal Oak, MI (US); Jamie F Standring, Beverly Hills, MI (US)

(72) Inventors: Michael B Solt, Oxford, MI (US); Caleb M Coats, Royal Oak, MI (US); Jamie F Standring, Beverly Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 106 days.

(21) Appl. No.: 16/111,435

(22) Filed: Aug. 24, 2018

(65) Prior Publication Data
US 2020/0063859 A1   Feb. 27, 2020

(51) Int. Cl.
*F16H 61/02*   (2006.01)

(52) U.S. Cl.
CPC . *F16H 61/0213* (2013.01); *F16H 2061/0223* (2013.01); *F16H 2061/0227* (2013.01)

(58) Field of Classification Search
CPC ......... F16H 61/0213; F16H 2061/0223; F16H 2061/0225; F16H 2061/0227
See application file for complete search history.

(56) References Cited

U.S. PATENT DOCUMENTS

| | | | |
|---|---|---|---|
| 8,145,399 B2 | 3/2012 | Lindgren et al. | |
| 8,996,260 B2 | 3/2015 | Sata | |
| 9,074,680 B2 | 7/2015 | Pekema | |
| 9,115,803 B2* | 8/2015 | Fujii | F16H 61/0213 |
| 10,184,559 B2* | 1/2019 | Pfeifer | F16H 59/12 |
| 10,203,031 B2* | 2/2019 | Gauthier | F16H 61/0213 |
| 2009/0222181 A1* | 9/2009 | Lindgren | F16H 59/0204 701/64 |
| 2012/0204668 A1 | 8/2012 | Zito et al. | |
| 2014/0116178 A1* | 5/2014 | Sata | F16H 59/02 74/473.31 |
| 2015/0032339 A1* | 1/2015 | Pekema | F16H 59/044 701/51 |
| 2015/0066316 A1* | 3/2015 | Fujii | F16H 61/0213 701/51 |

(Continued)

*Primary Examiner* — David R Morris
(74) *Attorney, Agent, or Firm* — Ralph E Smith

(57) ABSTRACT

Control systems and methods for a vehicle automatic transmission utilize a driver interface configured to receive input from a driver of the vehicle relating to a custom shift mode of the automatic transmission and a controller configured to monitor a driving history of the vehicle and, based on the driving history, determine a reduced shift sequence for the transmission to utilize during the custom shift mode, the reduced shift sequence specifying a subset of available forward gears of the transmission to utilize during the custom shift mode, the subset of gears being less than a total number of available forward gears of the transmission, such that one or more available forward gears are skipped in the reduced shift sequence, initiate the custom shift mode for the transmission, and during the custom shift mode, control shifting of the transmission according to the reduced shift sequence.

20 Claims, 6 Drawing Sheets

(56) References Cited

U.S. PATENT DOCUMENTS

2016/0252177 A1* 9/2016 Pfeifer .................... F16H 59/12
                                                    74/473.12
2018/0023692 A1* 1/2018 Gauthier ............. F16H 61/0213
                                                      701/55

* cited by examiner

SYSTEMS AND METHODS FOR PROGRAMMING A GEAR SHIFT SEQUENCE FOR A CUSTOM SHIFT MODE OF AN AUTOMATIC TRANSMISSION

FIELD

The present application generally relates to vehicle automatic transmissions and, more particularly, to systems and methods for programming a gear shift sequence for a custom shift mode of an automatic transmission.

BACKGROUND

Some automatic transmission systems allow a driver to manually control gear shifting. These types of automatic transmission systems after often referred to as "manumatic" transmission systems. One way for the driver to control gear selection in these types of transmission systems is via one or more manual shift devices, e.g., paddle shifters arranged on a steering wheel or steering column of the vehicle. These manual shift devices are controlled by the driver to upshift or downshift the transmission system. Conventional manual shift modes for automatic transmission systems do not allow the driver to skip shift (e.g., shift from $1^{st}$ gear to $3^{rd}$ gear). Instead, the driver must sequentially shift through each gear ($1^{st}$ gear to $2^{nd}$ gear, $2^{nd}$ gear to $3^{rd}$ gear, etc.), which causes delay and decreased performance. In addition, conventional automatic transmission systems do not provide a way for the driver to customize a shift sequence, such as for a particular course or a particular maneuver. Accordingly, while such automatic transmission systems do work well for their intended purpose, there remains a need for improvement in the relevant art.

SUMMARY

According to one example aspect of the invention, a control system for an automatic transmission of a vehicle, the automatic transmission having a custom shift mode, is presented. In one exemplary implementation, the control system comprises: a driver interface configured to receive input from a driver of the vehicle relating to the custom shift mode and a controller configured to: monitor a driving history of the vehicle, the driving history comprising data relating to the use of each forward gear of the transmission over a driving period, based on the driving history, determine a reduced shift sequence for the transmission to utilize during the custom shift mode, the reduced shift sequence specifying a subset of available forward gears of the transmission to utilize during the custom shift mode, the subset of gears being less than a total number of available forward gears of the transmission, such that one or more available forward gears are skipped in the reduced shift sequence, initiate the custom shift mode for the transmission, and during the custom shift mode, control shifting of the transmission according to the reduced shift sequence.

In some implementations, the driver interface comprises one or more manual shift devices, and wherein during the custom shift mode, the controller controls shifting of the transmission according to the reduced shift sequence in response to driver input via the one or more manual shift devices. In other implementations, during the custom shift mode, the controller controls shifting of the transmission according to the reduced shift sequence without any driver input indicating a request to shift the transmission.

In some implementations, the driver interface comprises a touch display configured to receive touch input from the driver and display information to the driver, wherein the controller is configured to: display the driving history to the driver via the touch display, in response to displaying the driving history to the driver via the touch display, receive touch input from the driver via the touch display, and based on the touch input, determine the reduced shift sequence. In some implementations, the driving period begins in response to touch input from the driver via the touch display, and wherein the driving period is a predetermined duration or the driving period ends in response to touch input from the driver via the touch display.

In some implementations, the controller is configured to automatically determine the reduced shift sequence based on the driving history and without input from the driver via the touch display specifying one or more forward gears of the reduced shift sequence. In some implementations, the controller is further configured to store the reduced shift sequence at a memory of the controller as one of one or more a presets for future retrieval by the driver via the touch display. In some implementations, the driving history further comprises global positioning satellite (GPS) information indicating positioning of the vehicle on a track, and wherein the controller is configured to automatically determine the reduced shift sequence based on the GPS information.

In some implementations, the controller is configured to obtain the reduced shift sequence from a selection of one or more presets stored at a memory of the controller, the selected preset being selected by the driver by touch input via the touch display. In some implementations, the selected preset is one of a plurality of predetermined driving scenarios stored at the memory, each predetermined driving scenario having a predetermined reduced shift sequence.

According to another example aspect of the invention, a method of obtaining a subset of gears of an automatic transmission of a vehicle for controlling forward gear shifting during a custom shift mode for the transmission is presented. In one exemplary implementation, the method comprises: receiving, by a controller via a driver interface, an input from a driver of the vehicle relating to the custom shift mode, monitoring, by the controller, a driving history of the vehicle, the driving history comprising data relating to the use of each forward gear of the transmission over a driving period, based on the driving history, determining, by the controller, a reduced shift sequence for the transmission to utilize during the custom shift mode, the reduced shift sequence specifying a subset of available forward gears of the transmission to utilize during the custom shift mode, the subset of gears being less than a total number of available forward gears of the transmission, such that one or more available forward gears are skipped in the reduced shift sequence, initiating, by the controller, the custom shift mode for the transmission, and during the custom shift mode, controlling, by the controller, shifting of the transmission according to the reduced shift sequence.

In some implementations, the driver interface comprises one or more manual shift devices, and wherein during the custom shift mode, the shifting of the transmission is controlled by the controller according to the reduced shift sequence in response to driver input via the one or more manual shift devices. In other implementations, during the custom shift mode, the shifting of the transmission is controlled by the controller according to the reduced shift sequence without any driver input indicating a request to shift the transmission.

In some implementations, the driver interface comprises a touch display configured to receive touch input from the driver and display information to the driver, and further comprising: displaying, by the touch display in response to a command from the controller, the driving history to the driver via the touch display, in response to displaying the driving history to the driver via the touch display, receiving, by the controller via the touch display, touch input from the driver via the touch display, and based on the touch input, determining, by the controller, the reduced shift sequence.

In some implementations, the driving period begins in response to touch input from the driver via the touch display, and wherein the driving period is a predetermined duration or the driving period ends in response to touch input from the driver via the touch display. In some implementations, determining the reduced shift sequence comprises automatically determining, by the controller, the reduced shift sequence based on the driving history and without input from the driver via the touch display specifying one or more forward gears of the reduced shift sequence. In some implementations, the method further comprises storing, by the controller at a memory, the reduced shift sequence as one of one or more a presets for future retrieval by the driver via the touch display. In some implementations, the driving history further comprises global positioning satellite (GPS) information indicating positioning of the vehicle on a track, and wherein the automatic determination by the controller of the reduced shift sequence is based on the GPS information.

In some implementations, determining the reduced shift sequence comprises obtaining, by the controller, the reduced shift sequence from a selection of one or more presets stored at a memory of the controller, the selected preset being selected by the driver by touch input via the touch display. In some implementations, the selected preset is one of a plurality of predetermined driving scenarios stored at the memory, each predetermined driving scenario having a predetermined reduced shift sequence.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, conventional automatic transmission systems do not allow a driver to "skip shift" (e.g., shift from $1^{st}$ gear to $3^{rd}$ gear) during a manual shift mode and instead require the driver to sequentially shift through each gear. This causes driver frustration and shift delay, which is particularly problematic for high performance vehicles. In addition, newer automatic transmissions have increasingly more gears (9-speed transmissions, 10-speed transmissions, etc.) and not every gear is needed, especially during high performance driving. Conventional automatic transmission systems also do not provide a way for the driver to customize a shift sequence, such as for a particular course or a particular maneuver. Accordingly, improved automatic transmission systems and methods are presented. A touch display of the vehicle is utilized to display to the driver a driving history indicative of gear usage during a driving period. The driver is then able to provide touch input indicating a reduced shift sequence comprising a subset (i.e., less than all) of the gears to utilize for shifting during a custom shift mode. In some implementations, the touch display displays different reduced shift sequences for different driving scenarios (0 to 60 miles per hour, or MPH, 0 to 100 MPH, etc.) and/or presets previously provided by the driver. In some implementations, a controller automatically determines the reduced shift sequence based on the driving history and without touch input from the driver.

It will be appreciated that the term "custom shift mode" as used herein includes both a manual shift mode an automatic shift mode for the automatic transmission during which a customized reduced shift sequence is utilized. In the automatic shift mode for the automatic transmission, such as a "race" or "track" mode that is different than a default or normal mode (e.g., "drive" or "economy"), the automatic transmission performs gear shifting without driver inputs, but according to the customized reduced shift sequence. This customized reduced shift sequence could be a calibrated shift sequence that is automatically determined by the controller (e.g., based on an evaluation of the vehicle driving history) or could be manually specified by the driver of the vehicle. Such an automatic shift mode could allow the driver to focus on driving the vehicle and not worry about manual shift control, but while also using the customized reduced shift sequence. Manual shift device(s), however, may still be enabled and may still be usable during the automatic shift mode. In the manual shift mode, on the other hand, the driver provides physical inputs to control gear shifting of the automatic transmission according to the customized reduced shift sequence. By only utilizing the customized reduced shift sequence, unintended over or undershifting by the driver can be avoided, which allows them to better focus on driving the vehicle.

Figure 1:
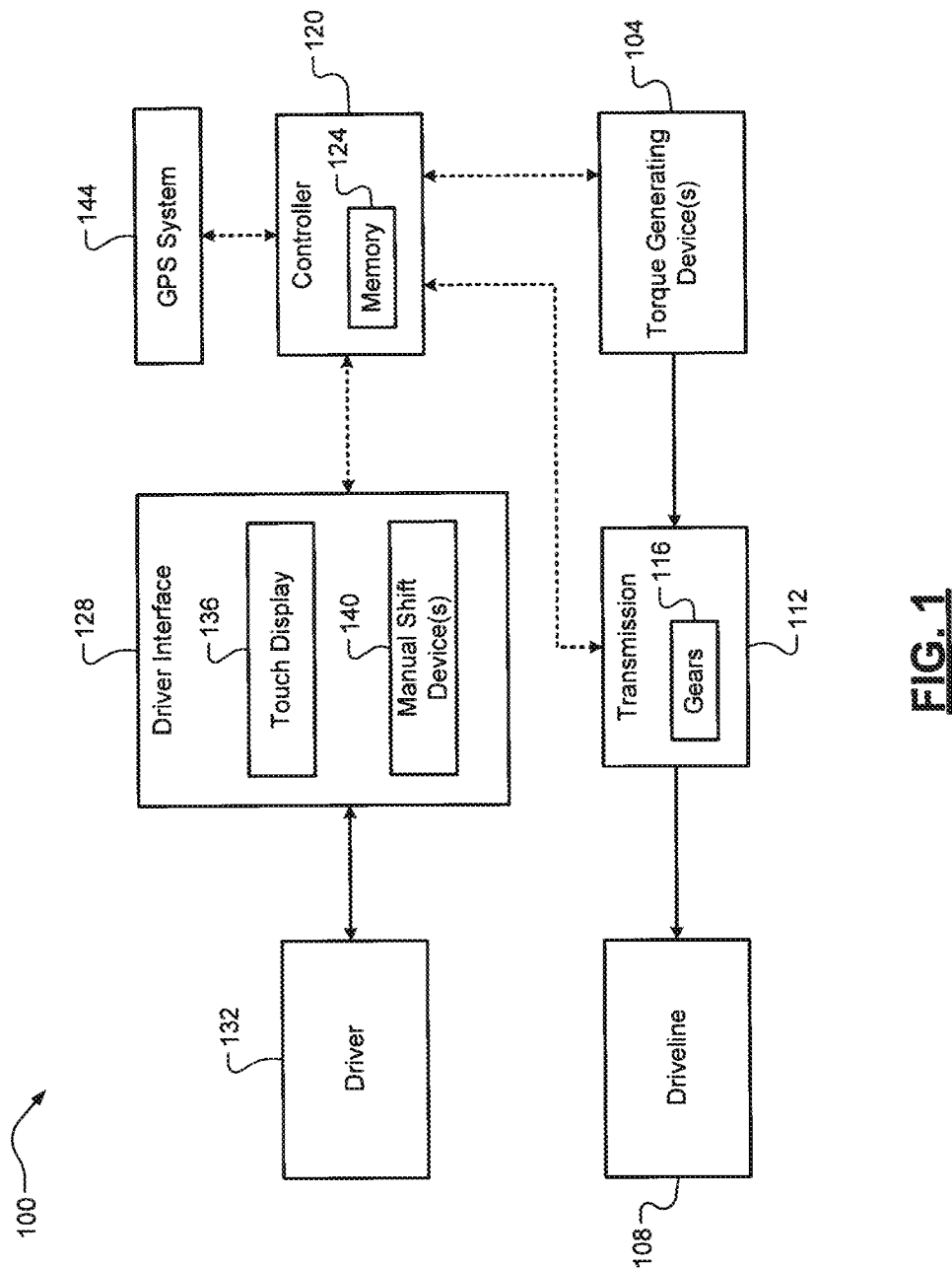
FIG. 1 is a functional block diagram of an example vehicle according to the principles of the present disclosure.

Referring now to FIG. 1, a functional block diagram of an example vehicle 100 is illustrated. The vehicle 100 includes one or more torque generating devices 104 that generate drive torque, which is transferred to a driveline 108 via an automatic transmission 112 comprising a plurality of forward gears 116. In one exemplary implementation, the transmission 112 comprises nine forward gears. It will be appreciated that the transmission 112 could further include other non-forward gears, such as a reverse gear. Non-limiting examples of the torque generating device(s) 104 include an internal combustion engine, an electric motor, and combinations thereof. A controller 120 comprising a memory 124 (e.g., a non-volatile memory, or NVM) controls the drive torque generated by and output by torque generating device(s) 104 and shifting between gears 116 of the transmission 112 for transfer of the drive torque to the driveline 108. The controller 120 receives, via a driver interface 128, input from a driver 132 of the vehicle 100.

Non-limiting examples of components of the driver interface 128 include a touch display 136 and one or more manual shift devices 140. The manual shift device(s) 140 could be one or more paddle shifters (e.g., on a steering wheel or steering column), a shift lever (e.g., tap up/down), or other suitable shift control device(s).

The touch display 136 is configured to receive touch input from and display information to the driver 132. The manual shift device(s) 140 are configured to receive driver input for commanding the controller 120 to control shifting between available forward gears 116 of the transmission 112. Some forward gears may not always be available, e.g., $1^{st}$ gear may be unavailable while the vehicle 100 is traveling at highway speeds. The controller 120 is also configured to monitor a driving history of the vehicle 100 during a driving period. In some implementations, the driving period is initiated by the driver 132 via a touch input at the touch display 136. The driving period could be a predetermined duration or then ended by another touch input by the driver 132 at the touch display 136. The driving history includes data (e.g., statistics) indicative of the usage of each forward gear 116 of the transmission 112 during the driving period. The controller 120 commands the touch display 136 to display the driving history to the driver 132. The driver 132 uses this information to provide touch input via the touch display 136 indicating a reduced shift sequence (i.e., a subset of the available forward gears 116) to utilize during the custom shift mode of the transmission 112. This subset of available forward gears 116 is less than a total number of available forward gears of the transmission 112 and could include gaps of two or more successive available forward gears.

Figure 2A:
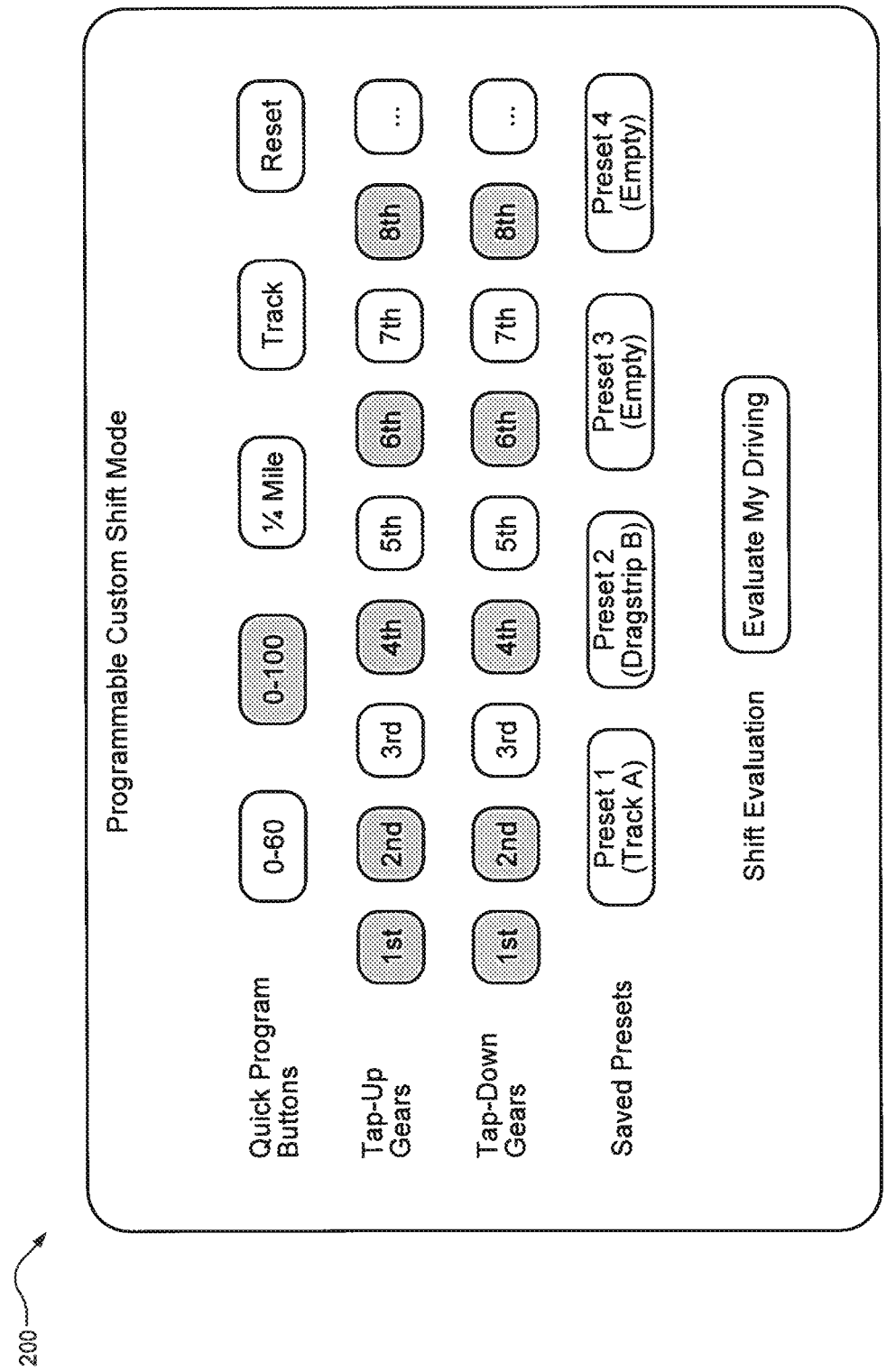
FIGS. 2A-2C illustrate example user interfaces for a touch display of the vehicle according to the principles of the present disclosure.
Figure 2B:
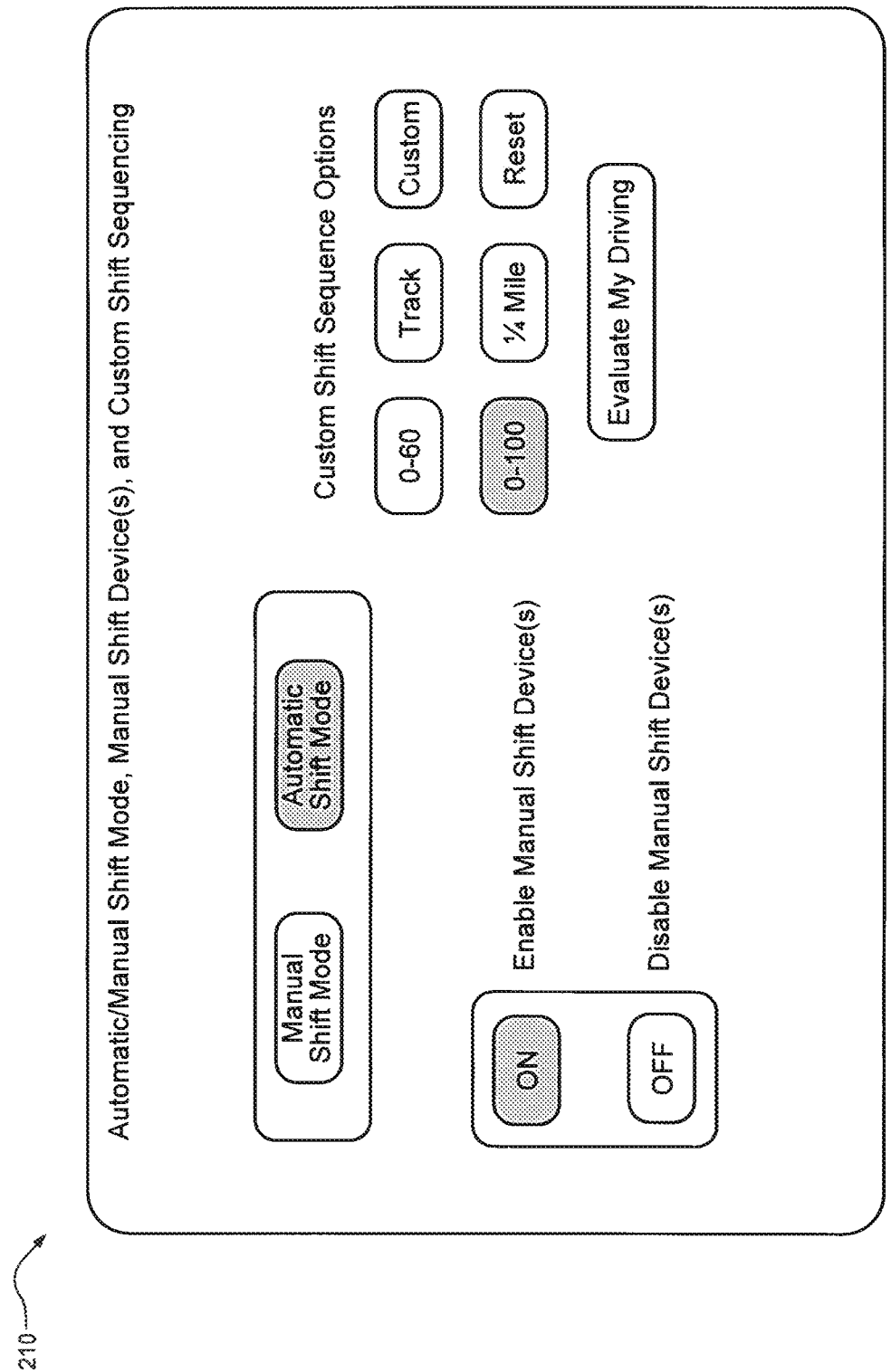
Figure 2C:
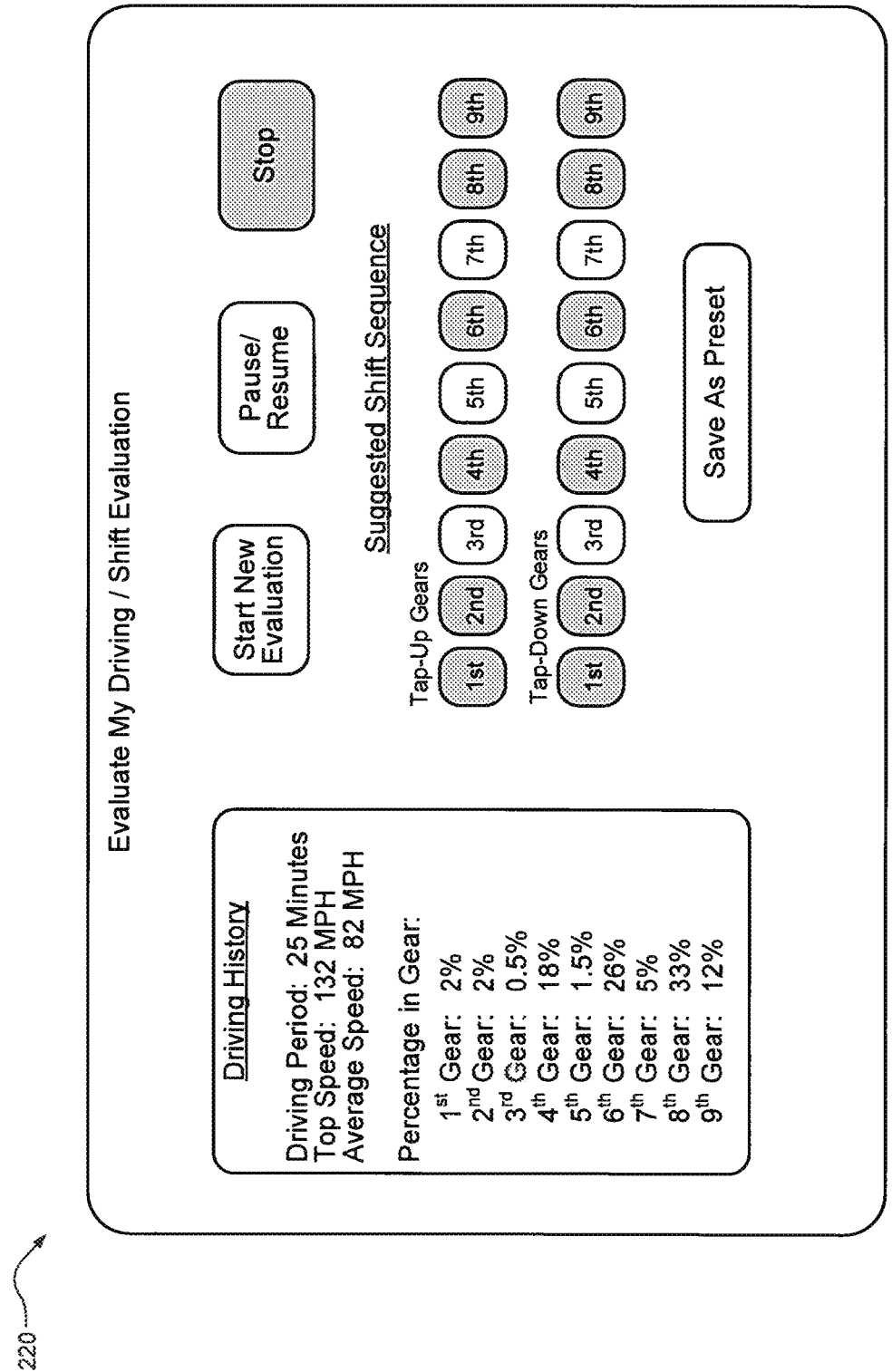

Referring now to FIGS. 2A-2C and with continued reference to FIG. 1, example user interfaces for display by the touch display 136 are illustrated. It will be appreciated that these user interfaces are merely for illustrative purposes and could vary by design and/or the information conveyed. In FIG. 2A, a first user interface 200 illustrates the current settings for the custom shift mode of the transmission 112. Quick program buttons correspond to predetermined driving scenarios (0-60, 0-100, ¼ mile, Track, etc.), each of which can have a different reduced shift sequence. As shown, the 0-100 quick program button has been selected and its respective reduced shift sequence includes $1^{st}$, $2^{nd}$, $4^{th}$, $6^{th}$, and $8^{th}$ gears. While the same reduced shift sequence are present for both tap-up and tap-down shifting, it will be appreciated that tap-up and tap-down shifting could have different subsets of the available forward gears 116. These subsets of available forward gears 116 could be predetermined (e.g., uploaded to the memory 124 during vehicle production) or previously determined by the controller 120.

There could also be additional available forward gears ($9^{th}$ gear, $10^{th}$ gear, etc.) that are represented the last button (" . . . ") in the respective rows. There are also saved preset buttons (Preset 1 through Preset 4). Two of the preset buttons have locations (racetracks, dragstrips, etc.) associated therewith (e.g., Track A and Dragstrip B). When selected, the driver 128 is able to manually specify the subset of available forward gears 116 for that particular preset. It should be noted that these driver presets are different than the quick program buttons, which correspond to predetermined driving scenarios. There is also a button towards the bottom of the user interface 200 that, when selected, commands the controller 120 to evaluate the driving history of the vehicle 100 for the driver 128. FIG. 2B illustrates a second user interface 210 for selecting the manual shift mode or the automatic shift mode and for controlling the enabling or disabling of the manual shift device(s) 140. As shown, the automatic shift mode is selected, the manual shift device(s) 140 are enabled, and the 0-100 quick program button (under "Custom Shift Sequence Options") has been selected.

FIG. 2C illustrates a third user interface 220 is displayed when the driver 128 selects the "Evaluate My Driving" button from either of the other user interfaces 200, 210. To begin, the driver 128 selects the "Start New Evaluation" button. This begins a driving period during which various parameters of the vehicle 100 are monitored. This primarily includes an amount of time (e.g., a percentage of the driving period) that the transmission 112 is in each of the various forward gears 116. The driving period and the monitoring or evaluation could be temporarily paused (e.g., while the vehicle 100 is temporarily stopped) and subsequently resumed using the "Pause/Resume" button. The driving period could be a predetermined amount of time or could be manually ended using the "Stop" button, which is shown to have been selected by the driver 128. The left box displays data (e.g., statistics) indicative of the driving history, including the driving period duration (25 Minutes), a top speed of the vehicle 100 (132 MPH), an average speed of the vehicle 100 (82 MPH), and percentages of the driving period that the transmission 112 was in each of gears 1-9.

Based on this collected information, the controller 120 determines a suggested reduced shift sequence, which includes a particular subset of available forward gears 116 for the evaluated driving history. As shown, $3^{rd}$ gear, $5^{th}$ gear, and $7^{th}$ gear are not part of the suggested reduced shift sequence. This is because their respective usage statistics were 0.5%, 1.5%, and 5%, which are all relatively low compared to neighboring gears. It will be appreciated that $1^{st}$ and $2^{nd}$ gear, while having relatively low usage statistics (2% for each) are kept as part of the reduced shift sequence because these gears 116 are required for very low speed operation of the vehicle 100 and these gears 116 are also necessary for optimal performance (e.g., optimal acceleration). There could also be a button that could be selected by the driver 128 to save this suggested shift sequence as one of the presets (e.g., empty Preset 3 in FIG. 2A).

It will be appreciated that other information could also be provided to the driver 128 via the touch display 136. For example, the gear usage and/or suggested gears could be localized, such as with respect to specific locations (e.g., turns) on a particular racetrack. In this example, an overhead view of the racetrack could be displayed (e.g., in conjunction with a navigation or global positioning satellite (GPS) system 144) and the gear usage and/or suggested gear could be displayed at various locations on the racetrack. In a similar example, the gear usage and/or suggested gears could be localized with respect to a particular dragstrip. By displaying this more detailed information to the driver 128, he/she may be better suited to understand and, in some cases, to modify the suggested reduced shift sequence.

While gear usage percentage is specifically illustrated in FIG. 2C and discussed above, it will also be appreciated that other information or additional information could be utilized in the determination of the suggested reduced shift sequence. For example only, the controller 120 could determine an optimal reduced shift sequence for a minimum lap time or a maximum engine power band, such as for a particular track or road course. More particularly, based on the driving history, the controller 112 could determine that a particular reduced shift sequence produced a better lap time or engine power band on the particular track or road course compared to another reduced shift sequence. Thus, the controller 120 could provide the optimal reduced shift sequence to the driver as the suggested reduced shift sequence. It will be appreciated that lap times and engine power bands are merely example parameters that could be optimized and that the suggested reduced shift sequence could be determined by the controller 120 to satisfy any desired parameters or conditions.

Figure 3A:
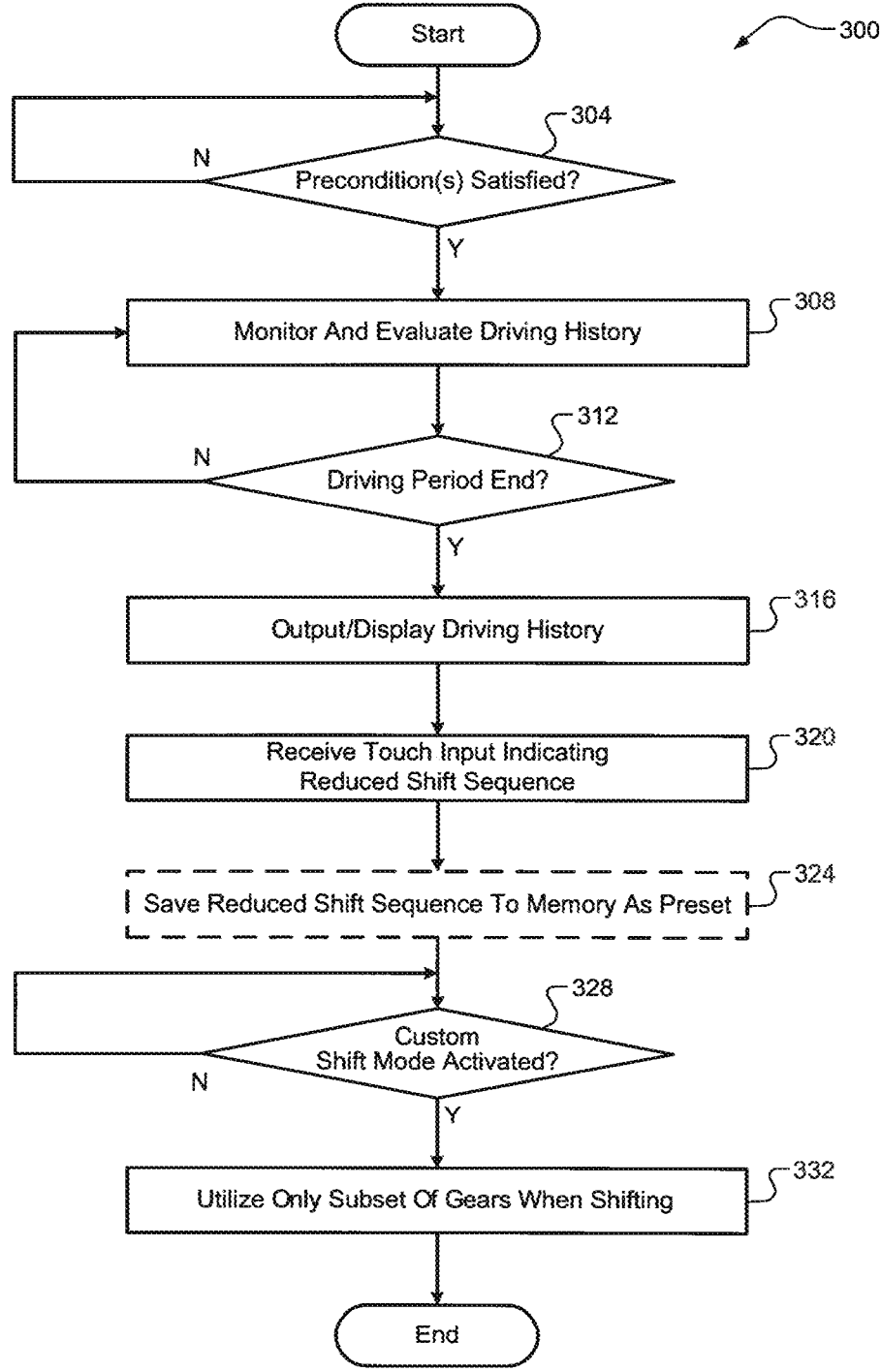
FIGS. 3A-3B are flow diagrams of example methods of driver-specified and automatic programming of gear shift sequences for a custom shift mode of an automatic transmission of the vehicle according to the principles of the present disclosure.
Figure 3B:
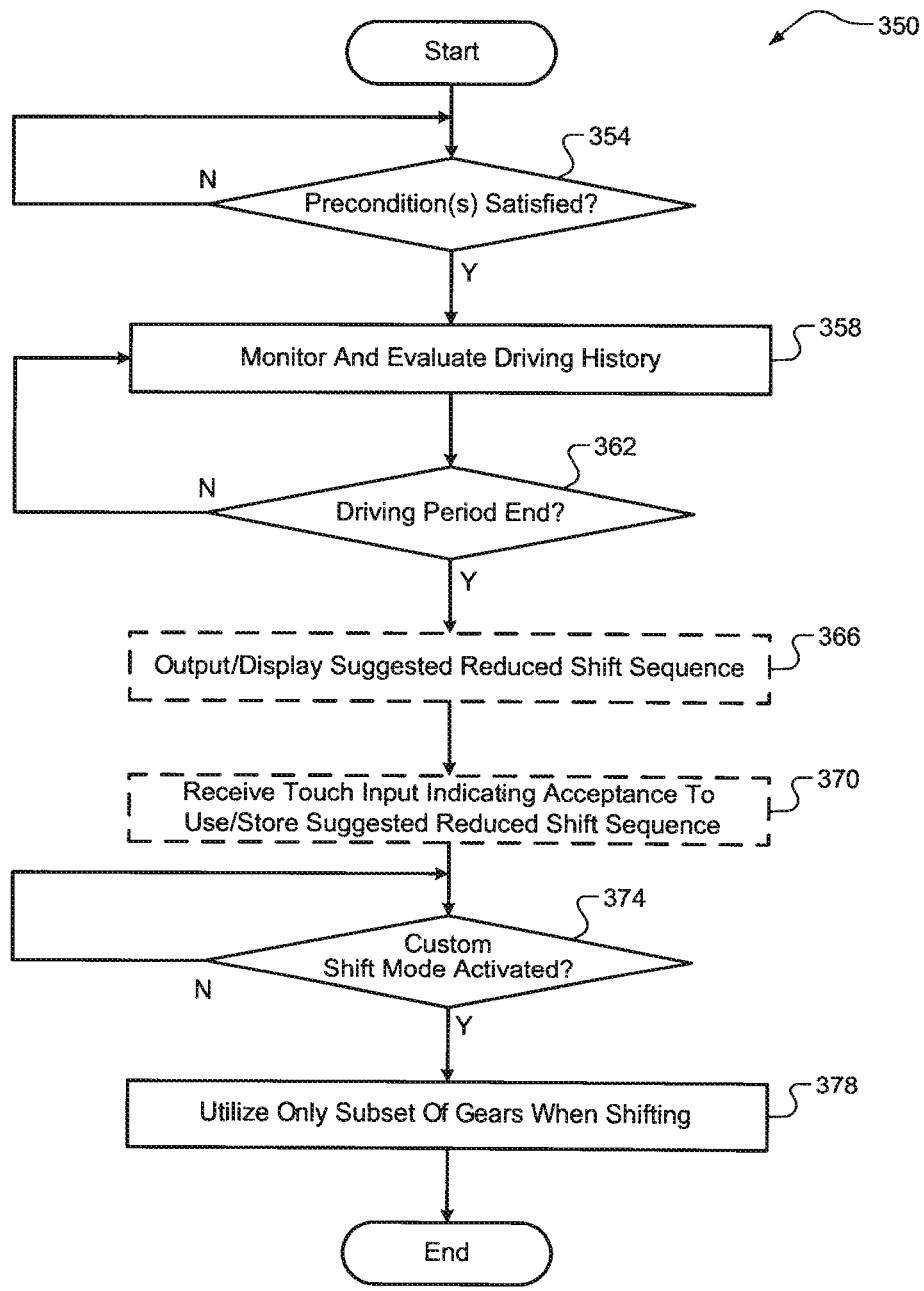

Referring now to FIGS. 3A-3B and with continued reference to FIG. 1 and FIGS. 2A-2C, flow diagrams of example methods 300, 350 of driver-specified and automatic determination of reduced forward gear shift sequences for shifting during the custom shift mode of the transmission 112 are illustrated. It will be appreciated that aspects of the manual driving input method (FIG. 3A) and the automatic controller determination method (FIG. 3B) could be utilized in conjunction, such as the controller 120 outputting a suggested reduced shift sequence for display and then the driver 128 selecting a different reduced shift sequence for use.

FIG. 3A illustrates an example method 300 where the driver 128 is able to manually input or program a reduced shift sequence for shifting during the custom shift mode. At 304, the controller 120 determines whether one or more preconditions are satisfied. Non-limiting examples of these preconditions include the torque generating device(s) 104 being on or running, the transmission 112 being in drive or being shifted into drive, the driver 128 having provided a touch input to initiate evaluation of his/her driving history, and the custom shift mode being disabled. When satisfied, the method 300 proceeds to 304. Otherwise, the method 300 ends. At 308, the controller 120 monitors one or more driving parameters during a driving period to at least determine usage data for each forward gear 116 of the transmission 112. At 312, the controller 120 determines whether the driving period during which evaluation is occurring has ended. This could be either the expiration of a predetermined timer or the driver 128 providing another touch input to end the driving period. When true, the method 300 proceeds to 316. Otherwise, the method 300 returns to 308.

At 316, the controller 120 outputs the driving history to the driver 128 via the touch display 132. At 320, the controller 120 receives touch input from the driver 128 via the touch display 132 indicating the reduced shift sequence to be used during the custom shift mode. This could be either the selection of a predetermined driving scenario, the selection of a previously stored preset, or the manual input of the reduced shift sequence. For example, the driver 128 may analyze the driving history to determine which available forward gears 116 of the transmission 112 that he/she would like to utilize during the custom shift mode. At optional 324, the controller 120 optionally saves the reduced shift sequence (e.g., when manually input by the driver 128) as a new preset. At 328, the controller 120 determines whether the custom shift mode has been initiated or activated with the reduced shift sequence selected. When true, the method 300 proceeds to 332. Otherwise, the method 300 ends or returns to 304 or 328. At 332, the controller 120 controls shifting according to the reduced shift sequence (i.e., between only the subset of available forward gears 116 of the transmission 112) either automatically or in response to inputs from the driver 128 via the manual shift device(s) 136 (e.g. tap-up and tap-down inputs). The method 300 then ends or returns to 304.

FIG. 3B illustrates an example method 350 where the controller 120 automatically determines a reduced shift sequence for shifting during the custom shift mode. At 354, the controller 120 determines whether one or more preconditions are satisfied. Non-limiting examples of these preconditions include the torque generating device(s) 104 being on or running, the transmission 112 being in drive or being shifted into drive, the driver 128 having provided a touch input to initiate evaluation of his/her driving history, and the custom shift mode being disabled. When satisfied, the method 350 proceeds to 354. Otherwise, the method 350 ends. At 358, the controller 120 monitors one or more driving parameters during a driving period to at least determine usage data for each forward gear 116 of the transmission 112. At 362, the controller 120 determines whether the driving period during which evaluation is occurring has ended. This could be either the expiration of a predetermined timer or the driver 128 providing another touch input to end the driving period. When true, the method 300 proceeds to 366. Otherwise, the method 300 returns to 358.

At optional 366, the controller 120 displays a suggested reduced shift sequence (i.e., a subset of available forward gears 116) to the driver 128 via the touch display 132 that is to be used during the custom shift mode. This displaying could further include the driving history. The suggested reduced shift sequence could be, for example, optimized to include which available forward gears 116 of the transmission 112 that the driver 128 is likely to want to utilize during the custom shift mode. At optional 370, the controller 120 receives a touch input from the driver 128 confirming or accepting the suggested reduced shift sequence and, in some cases, confirming to accept or store the suggested reduced shift sequence at the memory 124 as a preset. These steps are optional because it will be appreciated that the controller 120 could evaluate the driving history of the vehicle 100 and then determine and adopt an optimized shift sequence without any display of information or input from the driver 128. At 374, the controller 120 determines whether the custom shift mode has been initiated or activated. When true, the method 350 proceeds to 378. Otherwise, the method 300 ends or returns to 354 or 378. At 378, the controller 120 controls shifting according to the reduced shift sequence (i.e., between only the subset of available forward gears 116 of the transmission 112) either automatically or in response to inputs from the driver 128 via the manual shift device(s) 136 (e.g. tap-up and tap-down inputs). The method 350 then ends or returns to 354.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an automatic transmission of a vehicle, the automatic transmission having a custom shift mode, the control system comprising:
   a driver interface configured to receive input from a driver of the vehicle relating to the custom shift mode; and a controller configured to:
monitor a driving history of the vehicle, the driving history comprising data relating to the use of each forward gear of the transmission over a driving period;
based on the driving history, determine a reduced shift sequence for the transmission to utilize during the custom shift mode, the reduced shift sequence specifying a non-sequential subset of forward gears of the transmission to utilize during the custom shift mode, the non-sequential subset of forward gears being less than a total number of forward gears of the transmission, such that one or more forward gears are skipped in the reduced shift sequence;
initiate the custom shift mode for the transmission; and
during the custom shift mode, control shifting of the transmission according to the reduced shift sequence.

2. The control system of claim 1, wherein the driver interface comprises one or more manual shift devices, and wherein during the custom shift mode, the controller controls shifting of the transmission according to the reduced shift sequence in response to driver input via the one or more manual shift devices.

3. The control system of claim 1, wherein during the custom shift mode, the controller controls shifting of the transmission according to the reduced shift sequence without any driver input indicating a request to shift the transmission.

4. The control system of claim 1, wherein the driver interface comprises a touch display configured to receive touch input from the driver and display information to the driver, wherein the controller is configured to:
display the driving history to the driver via the touch display;
in response to displaying the driving history to the driver via the touch display, receive touch input from the driver via the touch display; and
based on the touch input, determine the reduced shift sequence.

5. The control system of claim 4, wherein the driving period begins in response to touch input from the driver via the touch display, and wherein the driving period is a predetermined duration or the driving period ends in response to touch input from the driver via the touch display.

6. The control system of claim 4, wherein the controller is configured to automatically determine the reduced shift sequence based on the driving history and without input from the driver via the touch display specifying one or more forward gears of the reduced shift sequence, wherein the reduced shift sequence does not include at least one of the lowest utilized forward gears as indicated by the driving history.

7. The control system of claim 6, wherein the controller is further configured to store the reduced shift sequence at a memory of the controller as one of one or more a presets for future retrieval by the driver via the touch display.

8. The control system of claim 6, wherein the driving history further comprises global positioning satellite (GPS) information indicating positioning of the vehicle on a track, and wherein the controller is configured to automatically determine the reduced shift sequence based on the GPS information.

9. The control system of claim 6, wherein the reduced shift sequence comprises a set of lowest forward gears of the transmission irrespective of their usage statistics, and wherein the reduced shift sequence does not comprise any of a remainder of the forward gears of the transmission having respective usage statistics less than a threshold.

10. The control system of claim 4, wherein the controller is configured to obtain the reduced shift sequence from a selection of one or more presets stored at a memory of the controller, the selected preset being selected by the driver by touch input via the touch display, and wherein the selected preset is one of a plurality of predetermined driving scenarios stored at the memory, each predetermined driving scenario having a predetermined reduced shift sequence.

11. A method of obtaining a subset of gears of an automatic transmission of a vehicle for controlling forward gear shifting during a custom shift mode for the transmission, the method comprising:
receiving, by a controller via a driver interface, an input from a driver of the vehicle relating to the custom shift mode;
monitoring, by the controller, a driving history of the vehicle, the driving history comprising data relating to the use of each forward gear of the transmission over a driving period;
based on the driving history, determining, by the controller, a reduced shift sequence for the transmission to utilize during the custom shift mode, the reduced shift sequence specifying a non-sequential subset of forward gears of the transmission to utilize during the custom shift mode, the non-sequential subset of forward gears being less than a total number of forward gears of the transmission, such that one or more forward gears are skipped in the reduced shift sequence;
initiating, by the controller, the custom shift mode for the transmission; and
during the custom shift mode, controlling, by the controller, shifting of the transmission according to the reduced shift sequence.

12. The method of claim 11, wherein the driver interface comprises one or more manual shift devices, and wherein during the custom shift mode, the shifting of the transmission is controlled by the controller according to the reduced shift sequence in response to driver input via the one or more manual shift devices.

13. The method of claim 11, wherein during the custom shift mode, the shifting of the transmission is controlled by the controller according to the reduced shift sequence without any driver input indicating a request to shift the transmission.

14. The method of claim 11, wherein the driver interface comprises a touch display configured to receive touch input from the driver and display information to the driver, and further comprising:
displaying, by the touch display in response to a command from the controller, the driving history to the driver via the touch display;
in response to displaying the driving history to the driver via the touch display, receiving, by the controller via the touch display, touch input from the driver via the touch display; and
based on the touch input, determining, by the controller, the reduced shift sequence.

15. The method of claim 14, wherein the driving period begins in response to touch input from the driver via the touch display, and wherein the driving period is a predetermined duration or the driving period ends in response to touch input from the driver via the touch display.

16. The method of claim 14, wherein determining the reduced shift sequence comprises automatically determining, by the controller, the reduced shift sequence based on the driving history and without input from the driver via the touch display specifying one or more forward gears of the reduced shift sequence, wherein the reduced shift sequence does not include at least one of the lowest utilized forward gears as indicated by usage statistics of the driving history.

17. The method of claim 16, further comprising storing, by the controller at a memory, the reduced shift sequence as one of one or more a presets for future retrieval by the driver via the touch display.

18. The method of claim 16, wherein the driving history further comprises global positioning satellite (GPS) information indicating positioning of the vehicle on a track, and wherein the automatic determination by the controller of the reduced shift sequence is based on the GPS information.

19. The method of claim 16, wherein the reduced shift sequence comprises a set of lowest forward gears of the transmission irrespective of their usage statistics, and wherein the reduced shift sequence does not comprise any of a remainder of the forward gears of the transmission having respective usage statistics less than a threshold.

20. The method of claim 14, wherein determining the reduced shift sequence comprises obtaining, by the controller, the reduced shift sequence from a selection of one or more presets stored at a memory of the controller, the selected preset being selected by the driver by touch input via the touch display, wherein the selected preset is one of a plurality of predetermined driving scenarios stored at the memory, each predetermined driving scenario having a predetermined reduced shift sequence.

* * * * *